(12) United States Patent  (10) Patent No.: US 9,008,513 B2
Kim et al.  (45) Date of Patent: Apr. 14, 2015

(54) WAVELENGTH DIVISION MULTIPLEXING-PASSIVE OPTICAL NETWORK SYSTEM

(75) Inventors: Byoung Whi Kim, Daejeon (KR); Han Hyub Lee, Daejeon (KR); Jie Hyun Lee, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1320 days.

(21) Appl. No.: 12/809,065

(22) PCT Filed: Oct. 16, 2008

(86) PCT No.: PCT/KR2008/006122
§ 371 (c)(1),
(2), (4) Date: May 24, 2011

(87) PCT Pub. No.: WO2009/078572
PCT Pub. Date: Jun. 25, 2009

(65) Prior Publication Data
US 2011/0222855 A1 Sep. 15, 2011

(30) Foreign Application Priority Data
Dec. 18, 2007 (KR) .................. 10-2007-0133784

(51) Int. Cl.
*H04J 14/00* (2006.01)
*H04J 14/02* (2006.01)

(52) U.S. Cl.
CPC ........ *H04J 14/0282* (2013.01); *H04J 14/0246* (2013.01); *H04J 14/0247* (2013.01); *H04J 14/0252* (2013.01); *H04J 2014/0253* (2013.01)

(58) Field of Classification Search
CPC .... H04B 10/27; H04B 10/271; H04B 10/272; H04B 10/2725; H04B 10/2755; H04B 10/278; H04J 14/023; H04J 14/0228; H04J 14/0232; H04J 14/0235; H04J 14/0239; H04J 14/0242; H04J 14/0245; H04J 14/0249; H04J 14/025; H04J 14/0252; H04J 14/0246; H04J 14/0247; H04J 2014/0253
USPC .............................. 398/72, 71, 70, 67, 66, 58
See application file for complete search history.

(56) References Cited

U.S. PATENT DOCUMENTS 7,236,295 B2 * 6/2007 Yun et al. ...................... 359/344
7,978,976 B2 * 7/2011 Pohjola et al. ................. 398/72

(Continued)

FOREIGN PATENT DOCUMENTS

CN        1783764 A     6/2006
KR   2006-0100127 A     9/2006

(Continued)

OTHER PUBLICATIONS

Kim, Byoung-Whi et al. (WO 2007/133000 A1), Nov. 22, 2007.*

*Primary Examiner* — M. R. Sedighian
(74) *Attorney, Agent, or Firm* — Rabin & Berdo, P.C.

(57) ABSTRACT

The present invention proposes a wavelength division multiplexing-passive optical network (WDM-PON) system which transmits downstream data to an optical network unit (ONU) as an optical line termination (OLT) receives seed light from a spectrum-sliced external light source module. One characteristic of the proposed WDM-PON system is that optical transmitters of the OLT and ONU are operated regardless of optical wavelength. Another characteristic of the proposed WDM-PON system is that a conventional TDMA-PON (E-PON or G-PON) ONU can be accommodated without a change.

16 Claims, 11 Drawing Sheets

(56) References Cited

U.S. PATENT DOCUMENTS

2003/0007202 A1 1/2003 Moser et al.
2003/0007207 A1 1/2003 Healey et al.
2005/0041971 A1* 2/2005 Lee et al. ................ 398/72
2006/0008202 A1 1/2006 Shin et al.

FOREIGN PATENT DOCUMENTS

| KR | 2007-0109768 A | 11/2007 |
| WO | WO-2007027042 A1 | 3/2007 |
| WO | WO-2007/133000 A1 | 11/2007 |

* cited by examiner

WAVELENGTH DIVISION MULTIPLEXING-PASSIVE OPTICAL NETWORK SYSTEM

TECHNICAL FIELD

The present invention relates to a wavelength division multiplexing (WDM)-passive optical network (PON), and more particularly, to a WDM-PON system which uses spectrum-sliced external light as seed light.

The present invention was supported by the IT R&D program of Ministry of Information and Communication (MIC) and Institute for Information Technology Advancement (IITA) [Project No.: 2007-S-014-01, Project Title: Metro-Access Integrated Optical Network Technology].

BACKGROUND ART

A dense wavelength division multiplexing-passive optical network system (Dense WDM-PON, hereinafter, referred to as WDM-PON) is widely recognized as a next-generation ultimate optical network. One of the most important considerations in the WDM-PON technology is that an optical transmission module has to be independent on wavelength even if a plurality of optical wavelengths is used. The WDM-PON technology meeting this requirement is being widely studied all over the world. Among various methods, at present, there are two methods that have been developed to a commercial level: one of the methods is a wavelength locking WDM-PON and the other one is a wavelength reuse WDM-PON.

The wavelength locking method uses the phenomenon that when a seed light is injected into a special Fabry Perot laser diode (FP-LD) from outside, only the light of a wavelength injected into the FP-LD is amplified and the light of other wavelengths is suppressed. As the seed light source, a broad band light source (BLS) is used. In this method, two kinds of BLSs are installed in the central office. One of the two kinds of BLSs provides seed light to the FP-LD located at an optical line termination (OLT), and the other kind of BLS provides seed light to the FP-LD mounted at an optical network unit (ONU). The light transmitted from the BLSs is spectrum-sliced as it passes through an optical wavelength multiplexer (WDM MUX) included in the OLT and an optical wavelength multiplexer (WDM MUX) mounted at a remote node (RN), and the spectrum-sliced seed light is injected into the FP-LD.

The wavelength reuse method uses a reflective semiconductor optical amplifier (Reflective SOA; RSOA) as a light source for communications. An optical signal containing downstream data transmitted from the OLT is converted into a similar continuous wave (CW) light by removing downstream information in the RSOA at the ONU, and the converted light is demodulated into upstream data and transmitted to the OLT. Therefore, the demodulated optical signal transmitted to the ONU from the OLT serves seed light to the RSOA mounted at the ONU. Meanwhile, the RSOA mounted at the OLT, too, requires seed light, and, generally, external light is used as the seed light. Conventionally, a BLS is used as the external seed light source. That is, a broadband light transmitted from the BLS is spectrum-sliced as it passes through the WDM MUX mounted at the OLT, and the spectrum-sliced light is injected into the RSOA.

Meanwhile, in the conventional method for spectrum-slicing a BLS light by the WDM MUX located on a communications link and injecting it into the RSOA, there is no chose but to accept the loss of optical power in a spectrum slicing process, and hence there is a difficulty in reality in increasing the optical power of seed light to more than a predetermined level.

DISCLOSURE OF INVENTION

Technical Problem

It is an object of the present invention to provide a WDM-PON system, in which a spectrum-sliced light is transmitted by an external seed light module, thus generating no loss caused by spectrum slicing when passing through a WDM MUX located on a communications link.

It is another object of the present invention to provide a WDM-PON system, which can accommodate conventional G-PON and E-PON ONUs.

It is still another object of the present invention to provide a WDM-PON system, which can accept a conventional TDMA-PON method by using a dense wavelength division multiplexing (DWDM) transmission method for a feeder fiber section and having a wavelength conversion device at a subscriber side of distribution and drop sections.

Technical Solution

In order to accomplish the above and other objects, there is provided a wavelength division multiplexing-passive optical network system according to an embodiment of the present invention, comprising: an optical line termination located at the central office, and for transmitting an optical signal to a subscriber side and receiving an optical signal from the subscriber side; a seed light module located at the central office, and for supplying a spectrum-sliced seed light including a plurality of wavelengths to corresponding optical transmitters of the optical line termination; and an optical network unit located at the subscriber side, and for receiving an optical signal from the optical line termination, converting the same into an electric signal to obtain downstream information and transmitting an optical signal containing upstream data to the optical line termination.

In another aspect, there is provided a wavelength division multiplexing-passive optical network system according to an embodiment of the present invention, comprising: an optical line termination located at the central office, and for transmitting an optical signal to a subscriber side and receiving an optical signal from the subscriber side; a seed light module located at the central office, and for supplying a spectrum-sliced seed light including a plurality of wavelengths to corresponding optical transmitters of the optical line termination; an optical network unit located at the subscriber side, and for receiving an optical signal from the optical line termination, converting the same into an electric signal to obtain downstream information and transmitting an optical signal containing upstream data to the optical line termination; and an optical wavelength conversion device located at the subscriber side, and for wavelength-converting upstream and downstream signals into signals of different bands.

Advantageous Effects

In the WDM-PON system according to the embodiments of the present invention an external seed light module uses a spectrum-sliced light, thus preventing most of the loss caused by spectrum slicing upon passing through the optical wavelength multiplexer WDM MUX located on a communications link.

Furthermore, the WDM-PON system according to the embodiments of the present invention can improve transmission distance and transmission quality since seed light of a high power can be injected into the optical transmitters of the OLT.

Additionally, the WDM-PON system according to the embodiments of the present invention can use a dense wavelength division multiplexing (DWDM) method at the feeder fiber section while accommodating the conventional TDMA-PON optical network unit and optical power splitter without replacement by including an optical wavelength conversion device at a subscriber side. Consequently, feeder fiber can be reduced, and ultimately WDM-PON can be applied from a cost and economical standpoint.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, embodiments of the present invention will be described below with reference to the accompanying drawings.

Figure 1:
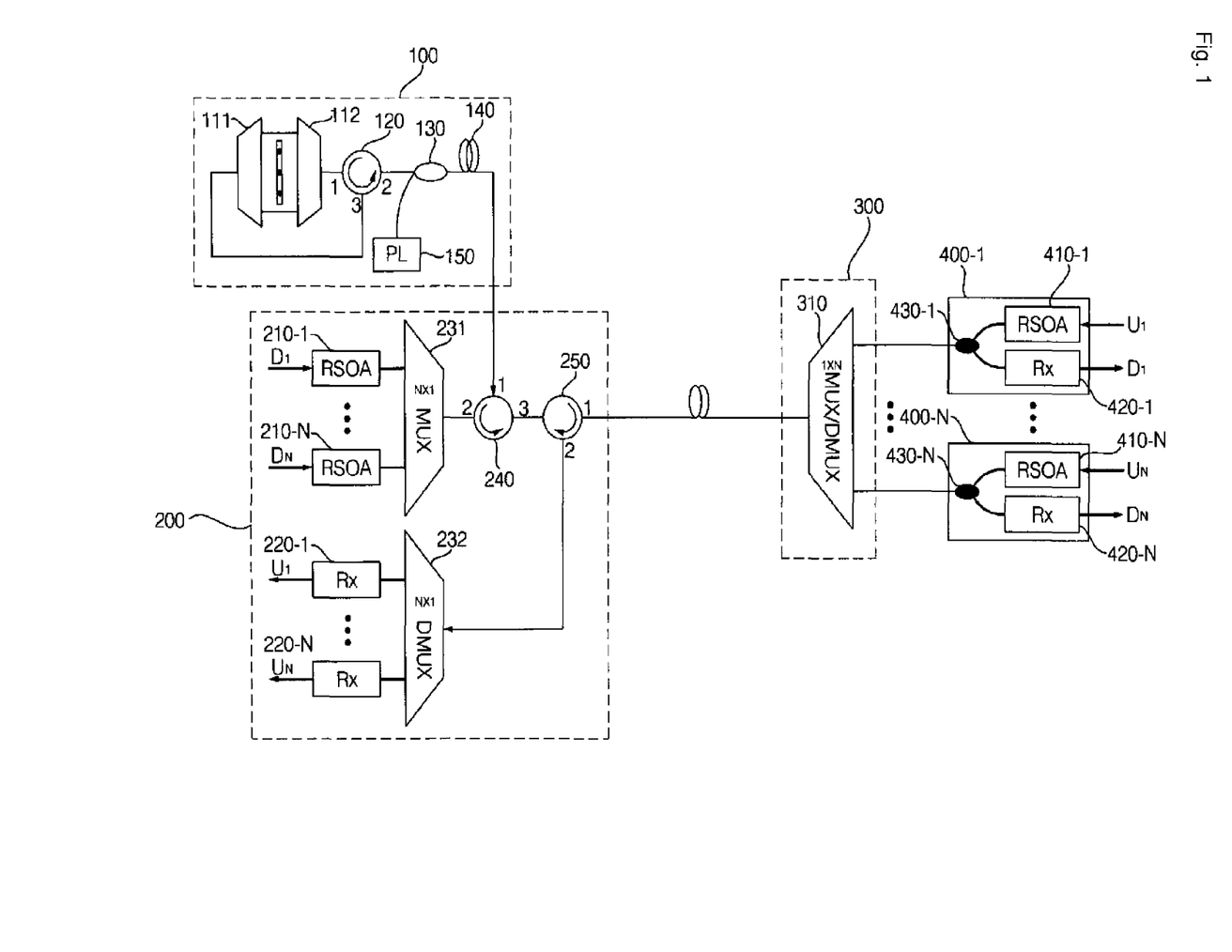
FIG. 1 is a view illustrating an optical backhaul network for broadband wireless service according to one embodiment of the present invention.

FIG. 1 is a view illustrating an optical backhaul network for broadband wireless service according to one embodiment of the present invention.

Referring to the drawing, the WDM-PON system according to one embodiment of the present invention includes a seed light module 100, an optical line termination (OLT) 200, a remote node (RN) 300, an optical network unit (ONU) 400. In the WDM-PON system of FIG. 1, a spectrum-sliced external light source module is used as seed light of an optical transmitter of the OLT, and a downstream optical signal demodulated into downstream data is used as seed light of the ONU.

The seed light module 100 includes an erbium-doped optical fiber (EDF) 140, a pump light source (pump LD) 150 for generating a carrier by injecting external light into the EDF 140, an optical coupler 130 for introducing light of the pump LD 150 into the EDF 140, an optical wavelength demultiplexer 112 for spectrum-slicing a broadband light outputted in a left direction from the EDF 140, an optical wavelength multiplexer 111 for optical wavelength-multiplexing the light spectrum-sliced by the optical wavelength demultiplexer 112, and an optical circulator 120 for circulating the light outputted from the optical wavelength multiplexer 111 in the direction of the EDF 140 and circulating the light outputted in the left direction from the EDF 140 in the direction of the optical wavelength demultiplexer 112.

A detailed operation of the seed light module 100 will be described below. The EDF 140 outputs a spontaneously-emitting light in both left and right directions. The left-directional spontaneously-emitting light continuously outputted over a broad wavelength band is inputted through a second terminal of the optical circulator 120 installed at the front end of the EDF 140 and outputted through a first terminal thereof, and the wavelength is spectrum-sliced/wavelength-multiplexed by the wavelength multiplexer/demultiplexer 112/111. The multiplexed light is inputted into a third terminal of the optical circulator 120, and then inputted into the EDF 140 through the second terminal of the optical circulator 120. In view of its characteristics, the optical circulator 120 outputs the light inputted into the first terminal to the second terminal only and outputs the light inputted into the second terminal to the third terminal only, and does not output light in the opposite direction.

The wavelength demultiplexer/multiplexer 112 and 111 are operated as follows. A broadband light inputted through one terminal is spectrum-sliced through a plurality of output terminals, and the spectrum-sliced light is inputted through a plurality of input terminals and then wavelength-multiplexed and outputted to one terminal.

The wavelength demultiplexer/multiplexer 112 and 111 can be implemented by use of a 1×N number of arrayed-waveguide gratings (AWGs) or thin film filters (TFTs). In the wavelength demultiplexer/multiplexer 112 and 111, the spectrum width to be divided and the number of divisions can be varied according to purposes. Further, in the spectrum slicing and multiplexing process, the function of flattening the intensity of output signals can be carried out by adjusting a connection loss for each channel.

To achieve the purpose of making a left directional spontaneously-emitting light enter into an optical amplifier, an optical distributor for distributing light at a predetermined ratio may be used in place of the optical circulator 120. However, it is preferred to use the optical circulator 120 causing less loss because the intensity of a reverse spontaneously emitting light to re-enter has to be maintained as high as possible. The wavelength-divided, spontaneously emitting light re-entered into the EDF 140 operates like an input signal of the optical amplifier, effectively amplified, and outputted to the right side. In configuring an optical fiber amplifier, the pump LD 150 can be configured in either left or right direction, or in both left and right directions.

The OLT 200 includes an optical transmitter 210 for transmitting an optical signal containing downstream information, an optical receiver 220 for receiving an upstream optical signal, an optical wavelength multiplexer 231 for wavelength-multiplexing downstream optical signals of different wavelengths, an optical wavelength demultiplexer 232 for wavelength-dividing upstream optical signals of different wavelengths, a first optical circulator 240 for circulating the light received from the seed light module 100 in the direction of the optical wavelength multiplexer 231 and circulating wavelength-multiplexed optical signals outputted from the optical wavelength multiplexer 231 in the direction of a feeder fiber, and a second optical circulator 250 for circulating the downstream optical signals sent from the first optical circulator 240 to the feeder fiber and circulating the upstream optical signals transmitted from the feeder fiber in the direction of the optical wavelength demultiplexer 232.

A detailed operation of the OLT 200 will be described below.

A spectrum-sliced light from the seed light module 100 is inputted into a first port of the first optical circulator 240 and outputted to a second port thereof, and inputted into the output port of the optical wavelength multiplexer 231 and wavelength-divided, and the divided wavelengths are entered into the RSOAs of the corresponding optical transmitters 210-1, . . . , 210-N, respectively. The seed light entered into the RSOA is amplified, demodulated by downstream data, and transmitted from the RSOA. The light transmitted from the RSOA is wavelength-multiplexed along with the optical signals outputted from the other RSOAs in the optical wavelength multiplexer 231. The wavelength-multiplexed light outputted from the optical wavelength multiplexer 231 is inputted into the second port of the first optical circulator 240 and outputted to a third port thereof, and then inputted into a third port of the second optical circulator 250 and outputted to a first port thereof and transmitted to the feeder fiber.

Meanwhile, wavelength-multiplexed upstream optical signals transmitted from the subscriber side are inputted into the first port of the second optical circulator 250 and outputted to the second port thereof, and inputted into the optical wavelength demultiplexer 232. The wavelength of the optical signals inputted into the optical wavelength demultiplexer 232 are divided, and the respective wavelengths are inputted into the corresponding receivers 220-1, . . . , 220-N, and converted into an electric signal UN in the receivers.

The RN 300 includes an optical wavelength multiplexer 310 for wavelength-dividing the wavelength-multiplexed downstream optical signals transmitted from the OLT and wavelength-multiplexing the optical signals of different wavelengths transmitted from the ONU 400.

The ONU 400 includes an optical receiver 420 for receiving a demodulated downstream optical signal and restoring downstream information, an optical transmitter 410 for receiving a downstream optical signal, changing it into a pseudo continuous wave (CW) light by removing downstream information, and then demodulating it into upstream data, and an optical coupler 430.

A detailed operation of the ONU 400 is as follows.

A part of an optical signal transmitted from the RN 300 is delivered to the optical transmitter 410 from the optical coupler 430, and the other part is delivered to the optical receiver 420. The downstream optical signal inputted into the RSOA included in the optical transmitter 410 is converted into a pseudo CW light by an optical and electric device, and the converted light is demodulated into upstream data and transmitted toward the OLT 200. Meanwhile, part of the optical power inputted into the optical receiver 420 is converted into an electric signal, thus restoring downstream data.

Figure 2:
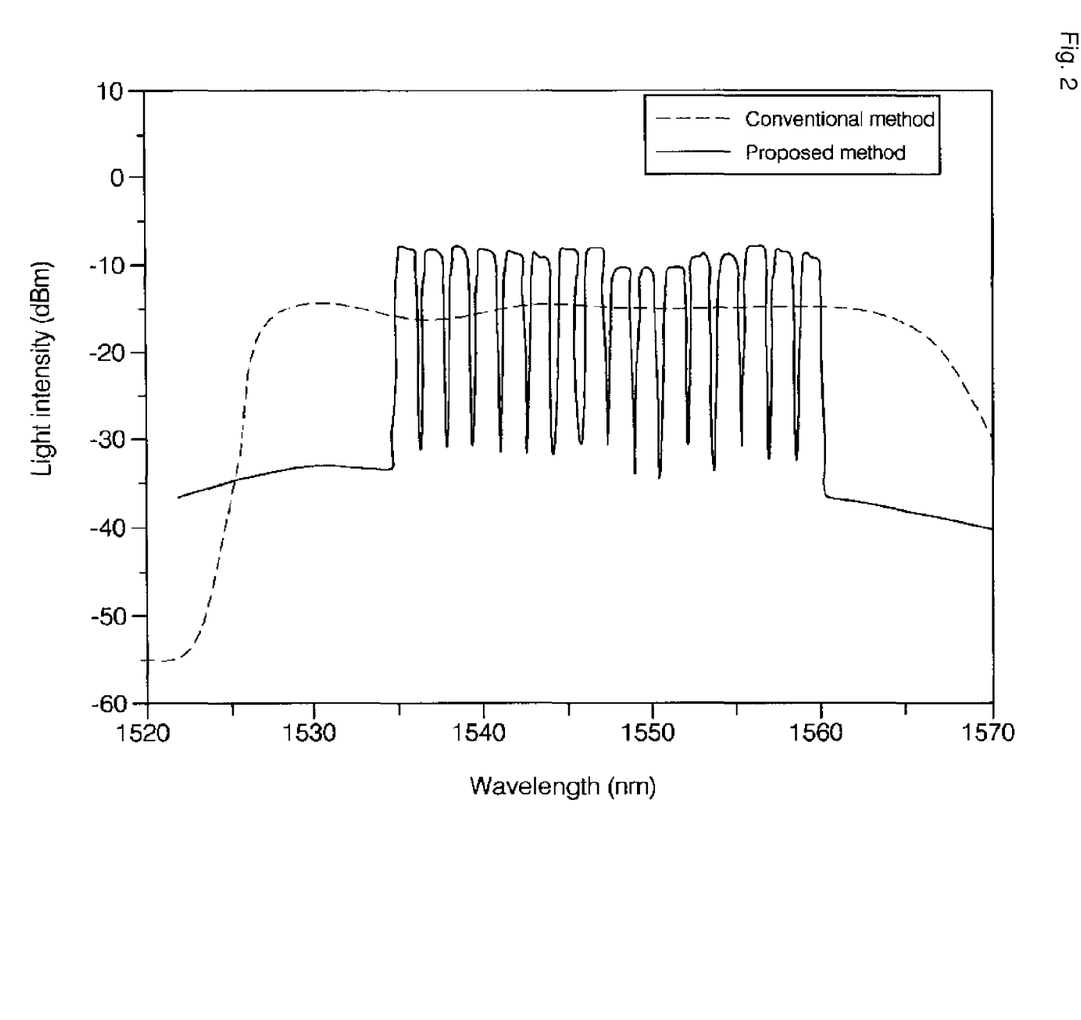
FIG. 2 is a view comparatively illustrating an output spectrum of a conventional WDM-PON system and an output spectrum of the WDM-PON system of FIG. 1.

FIG. 2 is a view comparatively illustrating an output spectrum of a conventional WDM-PON system and an output spectrum of the WDM-PON system of FIG. 1.

Referring to the drawing, FIG. 2 compares a spectrum outputted from a conventional BLS with a spectrum outputted from the seed light module 100 of the WDM-PON system according to one embodiment of FIG. 1.

The seed light module 100 slices a spectrum inside, and amplifies the respective spectrums. The OLT does not need to undergo a spectrum slicing process in the OLT, there is almost no loss caused by this. Therefore, output is remarkably increased compared to the conventional simple BLS. Further, since the function for making equal the power of the sliced spectrums inside the seed light module 100 can be easily realized, a spectrum-sliced light having an equal optical power in a wavelength-multiplexed state can be obtained if required.

Figure 3:
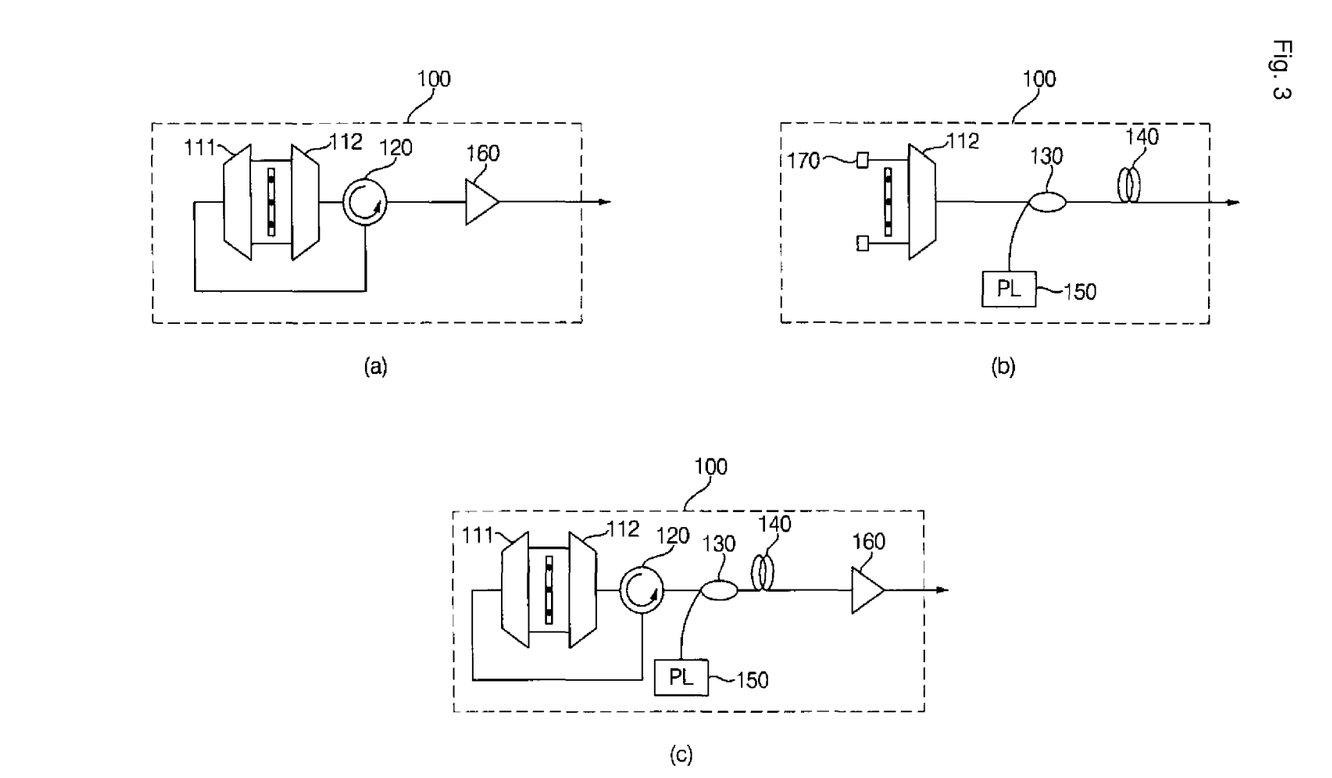
FIGS. 3(a) to 3(c) are block diagrams illustrating a seed light module according to one embodiment of the present invention.

FIGS. 3(*a*) to 3(*c*) are block diagrams illustrating a seed light module according to one embodiment of the present invention.

First, the seed light module 100 of FIG. 3(*a*) can use other kinds of optical fiber amplifiers and a semiconductor optical amplifier 160 as an optical amplification medium in place of an erbium-doped optical fiber (ETF) 140.

That is to say, the optical amplifier 160 amplifies external light, the optical wavelength demultiplexer spectrum-slices the broadband light outputted in the left direction from the optical amplifier, and the optical wavelength multiplexer wavelength-multiplexes the light spectrum-sliced by the optical wavelength demultiplexer, and the optical circulator circulates the light outputted form the optical wavelength multiplexer in the direction of the optical amplifier and circulates the light outputted in the left direction from the optical amplifier in the direction of the optical wavelength demultiplexer.

Next, the seed light module 100 of FIG. 3(*b*) has such a structure in which a high-reflectivity coating 170 is applied to the tip end of the optical wavelength demultiplexer 112 to replace the optical circulator 120 and the optical wavelength multiplexer 111 in the method of re-inputting a left directional spontaneously emitting light into the EDF 140. That is, the spectrum-sliced light is wavelength-multiplexed by the high-reflectivity coating 170 of the optical wavelength demultiplexer 112.

Next, the seed light module 100 of FIG. 3(*c*) may further include an optical amplifier 160 in addition to the EDF 140 in order to improve the output power of the spectrum-sliced light.

Figure 4:
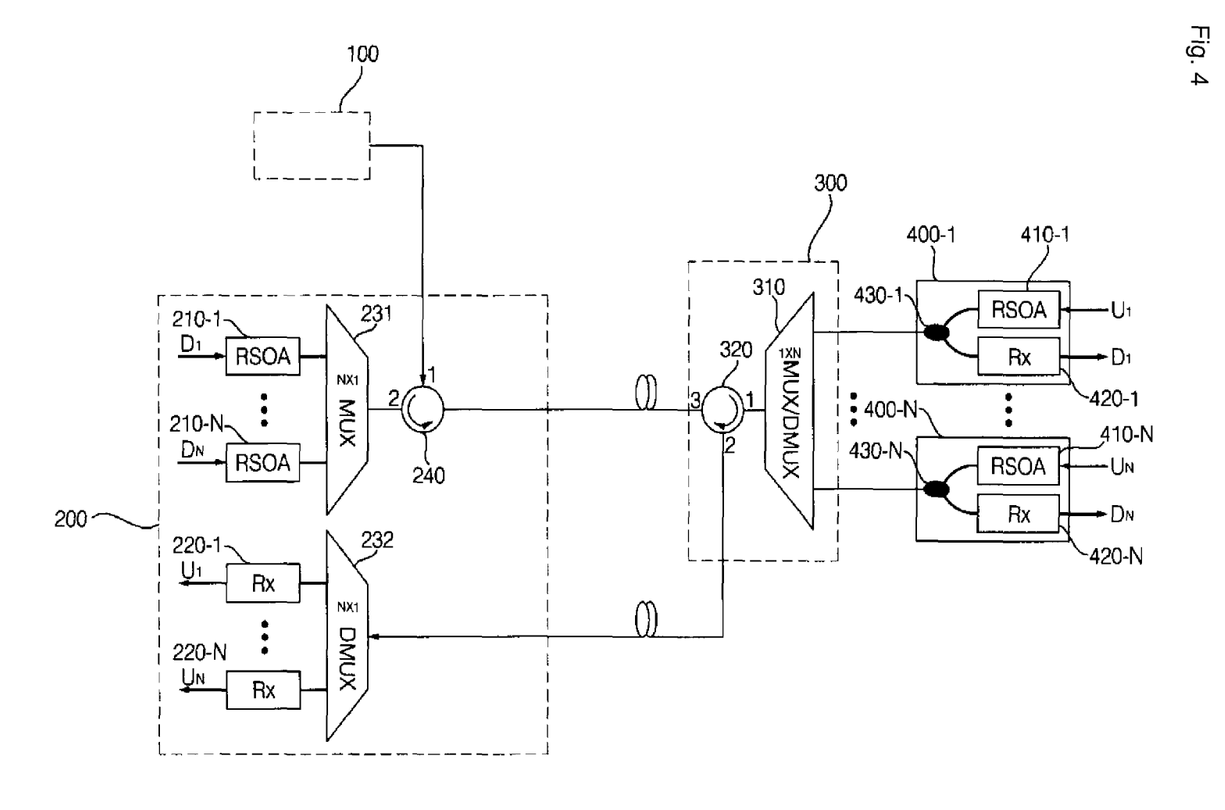
FIG. 4 is a block diagram illustrating a WDM-PON system according to one embodiment of the present invention.

FIG. 4 is a block diagram illustrating a WDM-PON system according to one embodiment of the present invention.

Referring to the drawing, the WDM-PON system of FIG. 4 has a similar structure to that of FIG. 1 except that, while the feeder fiber section of the WDM-PON system of FIG. 1 is made of a single optical fiber, the feeder fiber section of the WDM-PON system of FIG. 4 is made of two optical fibers. For this, an optical circulator 320 is located within a remote node (RN) 300, and serves as the second optical circulator 250 of FIG. 1.

FIGS. 5 to 8 are block diagrams illustrating a WDM-PON system according to an embodiment of the present invention.

Referring to the drawings, the WDM-PON system according to the embodiment of the present invention of FIGS. 5 to 8 can accept time division multiplexing access (TDMA) subscribers. That is, the WDM-PON system of FIGS. 5 to 8 is similar to the WDM-PON system of FIG. 1 for the most part. The difference is that optical power splitters 330-1, . . . , 330-N for respective wavelengths are mounted to the RN 300 in addition to the optical wavelength multiplexer 310. Thus, a downstream optical signal wavelength-divided from the optical wavelength multiplexer 310 is power-split in the optical power splitters 330-1, . . . , 330-N, and directed to an M-number of ONUs 400. Meanwhile, an upstream optical signal transmitted from the M-number of ONUs is collected in the optical power splitters 330-1, . . . , 330-N and inputted into the optical wavelength multiplexer 310, and wavelength-multiplexed with optical signals of different wavelengths and outputted to the OLT 200.

Figure 5:
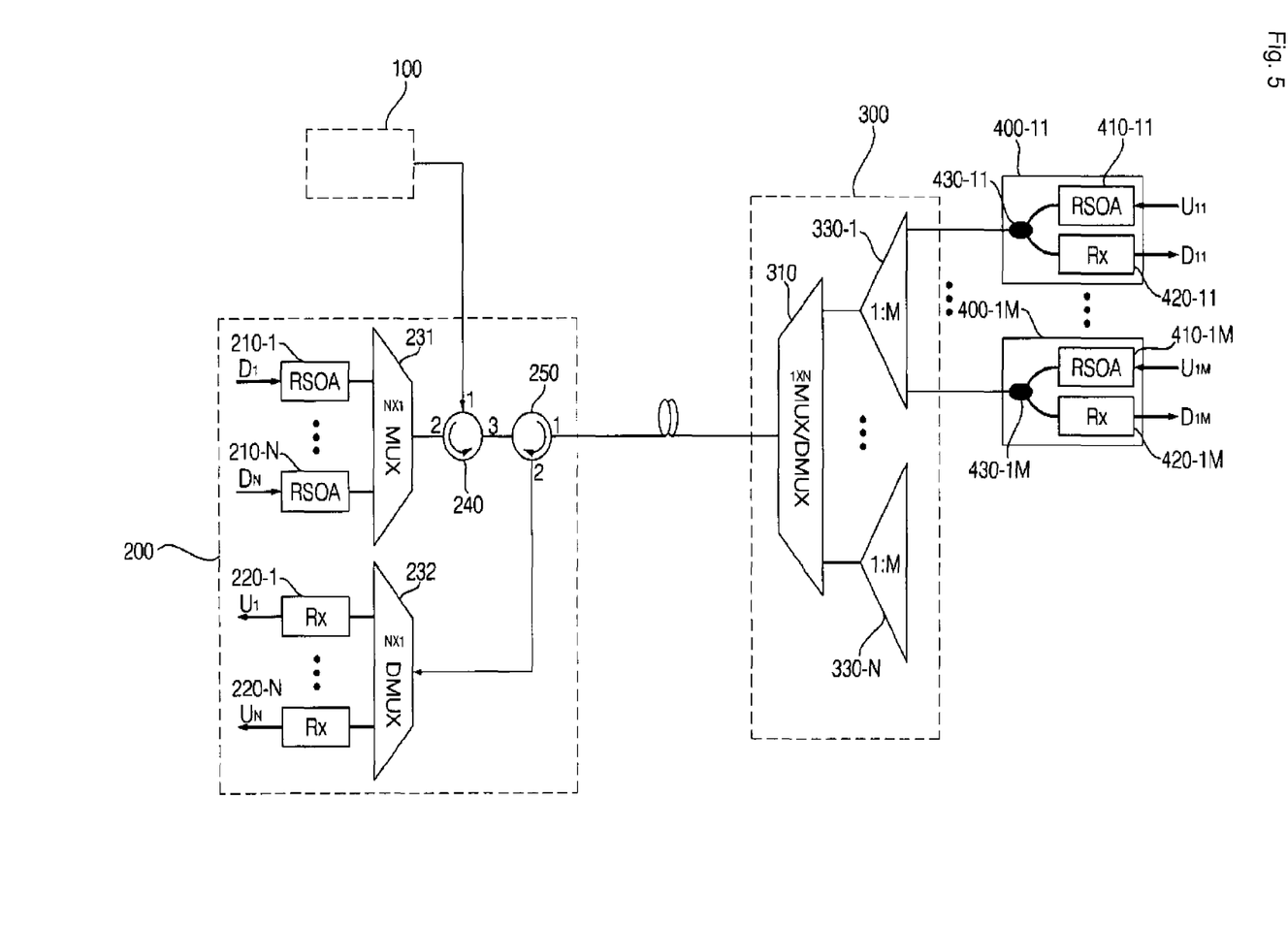
FIGS. 5 to 8 are block diagrams illustrating a WDM-PON system according to an embodiment of the present invention.

First, in the WDM-PON system of FIG. 5, the feeder fiber section is made of a single optical fiber. Thus, the second optical circulator 250 serving to separate upstream and downstream optical signals is located at the OLT.

Figure 6:
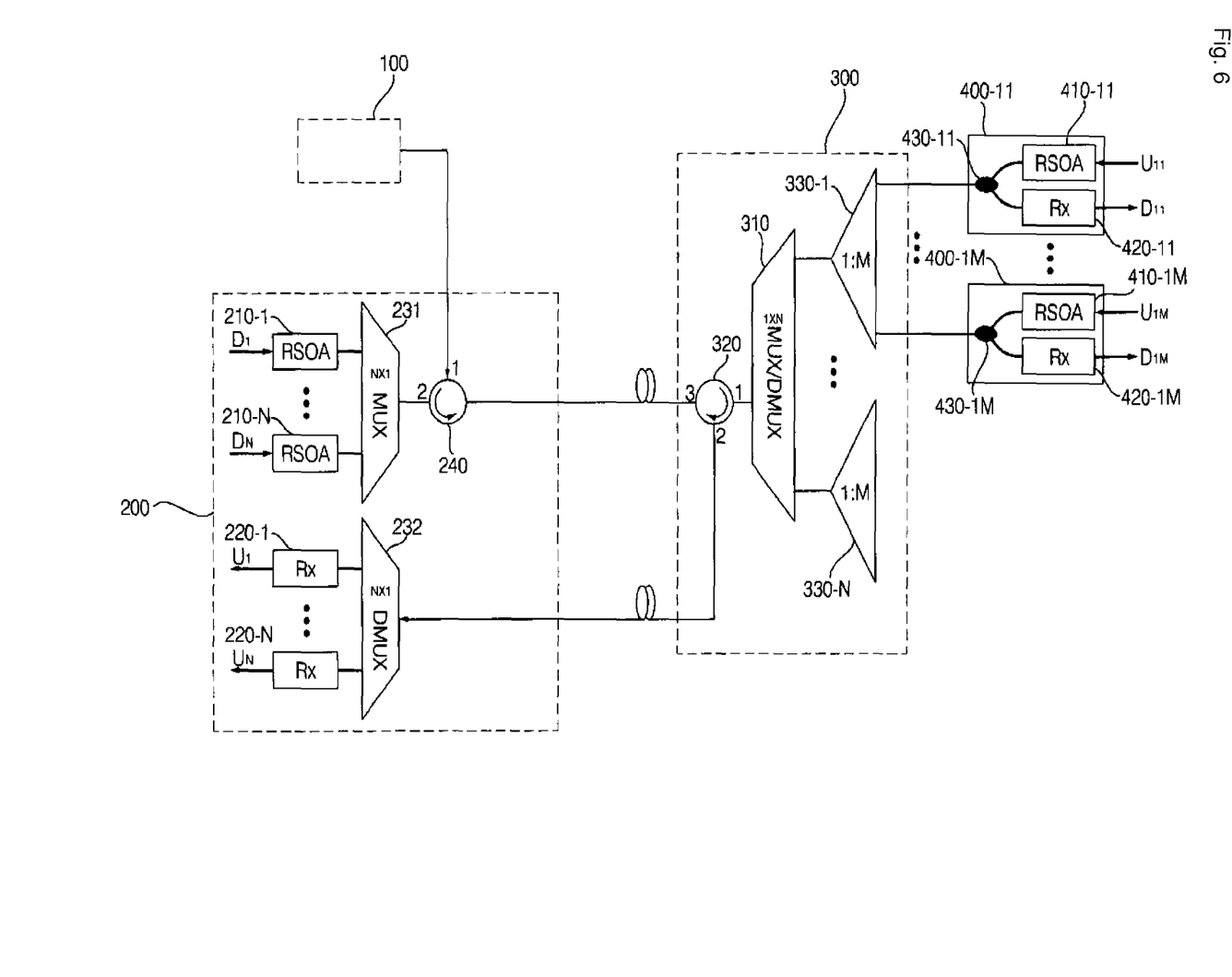

Next, in the WDM-PON system of FIG. 6, the feeder fiber section is made of two separate optical fibers. Thus, the optical circulator 320 serving to separate upstream and downstream optical signals is located at the RN.

Figure 7:
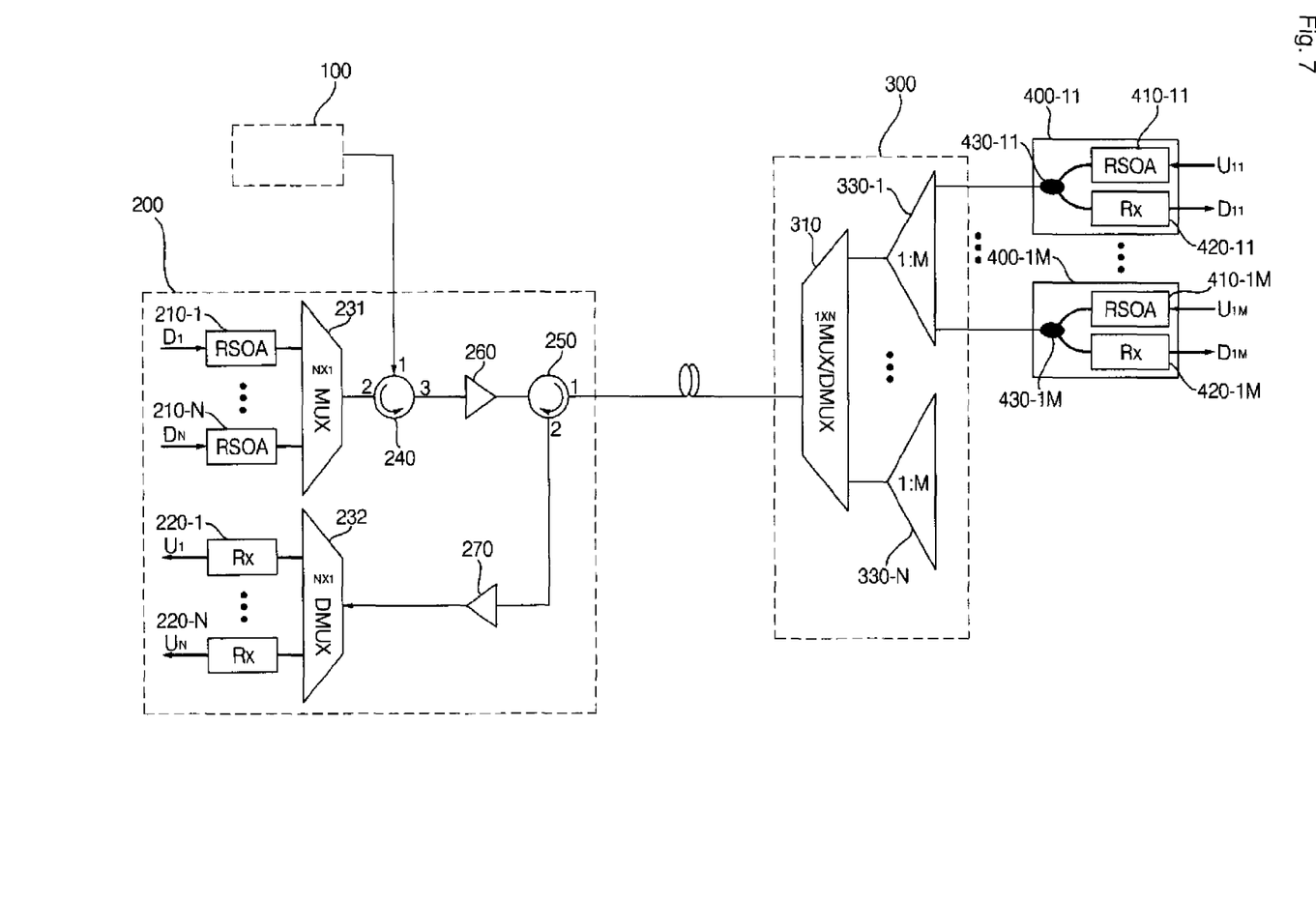

Next, in the WDM-PON system of FIG. 7, the feeder fiber section is made of a single optical fiber. Thus, the second optical circulator 250 serving to separate upstream and downstream optical signals is located at the OLT. Further, optical amplifier 260 and 270 are added in order to increase optical transmission distance.

Figure 8:
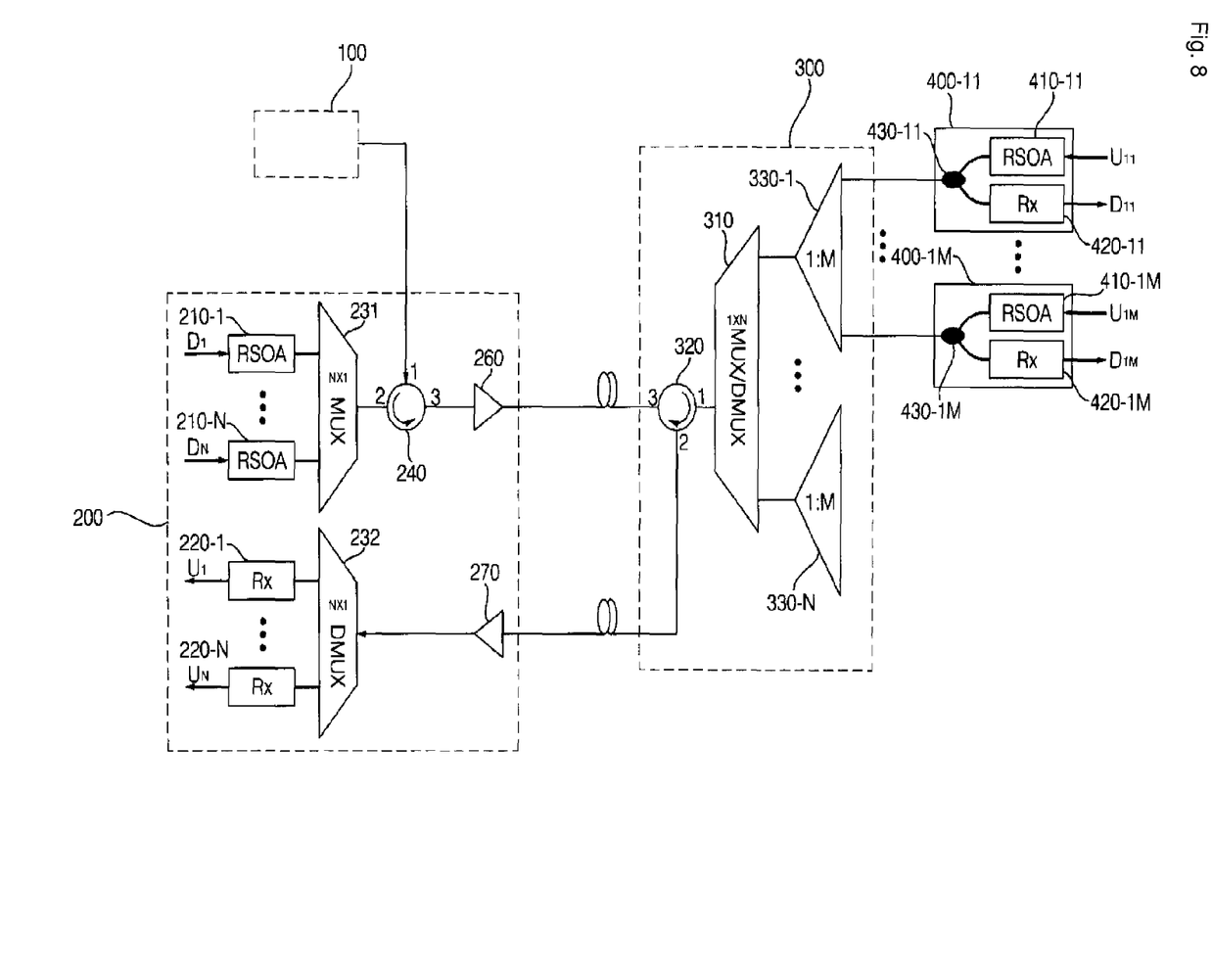

Next, in the WDM-PON system of FIG. 8, the feeder fiber section is made of two separate optical fibers. Thus, the optical circulator 320 serving to separate upstream and downstream optical signals is located at the RN. Further, optical amplifier 260 and 270 are added in order to increase optical transmission distance.

Figure 9:
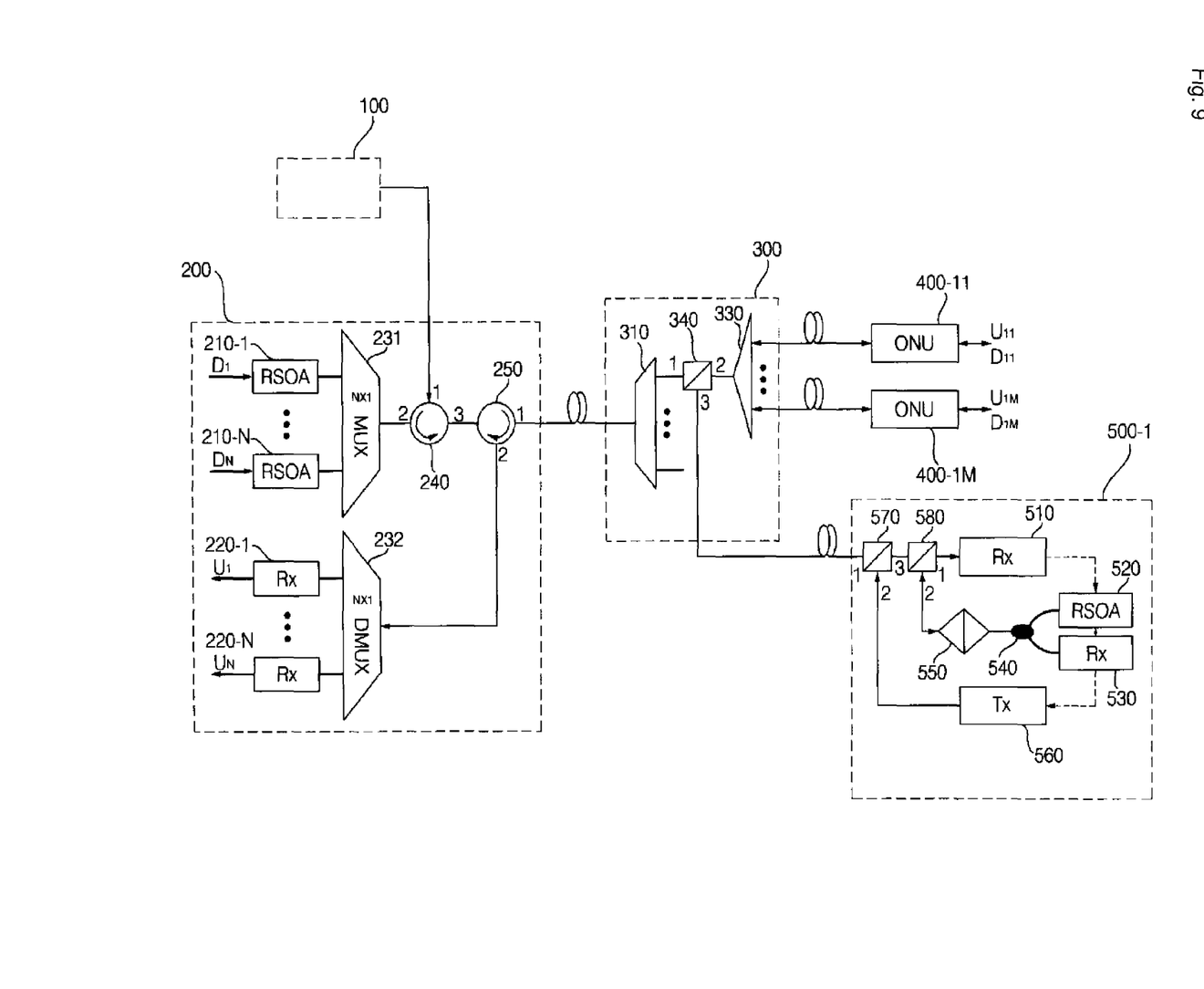
FIG. 9 is a block diagram illustrating a WDM-PON system according to one embodiment of the present invention.

FIG. 9 is a block diagram illustrating a WDM-PON system according to one embodiment of the present invention.

Referring to the drawing, the WDM-PON system of FIG. 9 has a structure in which a TDMA ONU can be used as it is without replacement. The difference from FIG. 5 is as follows.

The RN further includes an optical filter 340. That is, the RN includes an optical wavelength multiplexer 310, an optical power splitter 330, and an optical filter 340.

The WDM-PON system of FIG. 9 further includes an optical wavelength conversion device 500 located at a subscriber side.

The optical wavelength conversion device 500 includes a first optical filter 570, a second optical filter 580, a first optical receiver 510, a second optical receiver 530, a first optical transmitter 560, a second optical transmitter 520, a bidirectional amplifier 550, and an optical coupler 540.

The operations of the RN 300 and subscriber-side devices 400 and 500 will be described below.

Downstream optical signals transmitted in the WDM method are made up of C-band optical wavelengths. The downstream optical signals are wavelength-divided in the optical wavelength multiplexer 310, and the wavelength-divided optical signals are inputted into a first port of the optical filter 340 and outputted to a third port thereof, and inputted into a first port of the first optical filter 570 located within the optical wavelength conversion device 500. The downstream optical signals inputted into the first port of the optical filter 570 1 are outputted to a third port thereof, inputted into the second optical filter 580, and outputted to a second port of the second optical filter 580. The optical signals outputted to the second port of the second optical filter 580 are amplified in the bidirectional amplifier 550, and the optical power is split in the optical coupler, and thus some part is inputted into a reflective semiconductor optical amplifier (RSOA) of the second optical transmitter 520 and the other part is inputted into the second optical transmitter 530 and converted into electric signals. The downstream electric signals outputted from the second optical transmitter 530 are inputted into the first optical transmitter 560, converted into optical signals having a 1490 nm wavelength consistent with the downstream optical signal wavelength band of TDM-PON and transmitted, and inputted into a second port of the first optical filter 570. The downstream optical signals having a 1490 nm wavelength inputted into the second port of the first optical filter 570 are outputted to the first port of the first optical filter 570, inputted into a third port of the optical filter 340 located within the RN 300, and outputted to a second port of the optical filter 340. The optical power of the outputted optical signals of 1490 nm wavelength are split in the optical power splitter 330 and directed to an M-number of ONUs 400.

Meanwhile, upstream optical signals of 1310 nm wavelength transmitted from the M-number of ONUs 400 are collected in the optical power splitter 330 within the RN 300, inputted into the second port of the optical filter 340, and outputted to the third port thereof. The upstream optical signals of 1310 nm wavelength are inputted into the first port of the first optical filter 570 within the optical wavelength conversion device 500 and outputted to the third port thereof, inputted into the second optical filter 580 and outputted to the first port thereof, and inputted into the first optical receiver 510 and converted into electric signals. The electric upstream signals are inputted into the RSOA of the second optical transmitter 520 and converted into optical signals having the wavelength of downstream optical signals and outputted. Meanwhile, downstream optical signals having a C-band optical wavelength inputted into the RSOA 520 through the optical coupler 540 are converted into a pseudo CW light in the second optical transmitter 520 and used as upstream light. The upstream optical signals outputted from the RSOA 520 are amplified in the bidirectional amplifier 550, inputted into the second port of the second optical filter 580 and outputted to the third port thereof, and inputted into the first optical filter 570 and outputted to the first port thereof. The upstream optical signals of the C-band outputted from the optical wavelength conversion device 500 are inputted into the third port of the optical filter 340 within the RN 300 and outputted to the first port thereof, and wavelength-multiplexed with upstream signals having different wavelengths in the optical wavelength multiplexer 310, and transmitted to the OLT 200. The bidirectional amplifier 550 in the optical wavelength conversion device 500 may not be used depending on the transmission distance of upstream and downstream optical signals.

Figure 10:
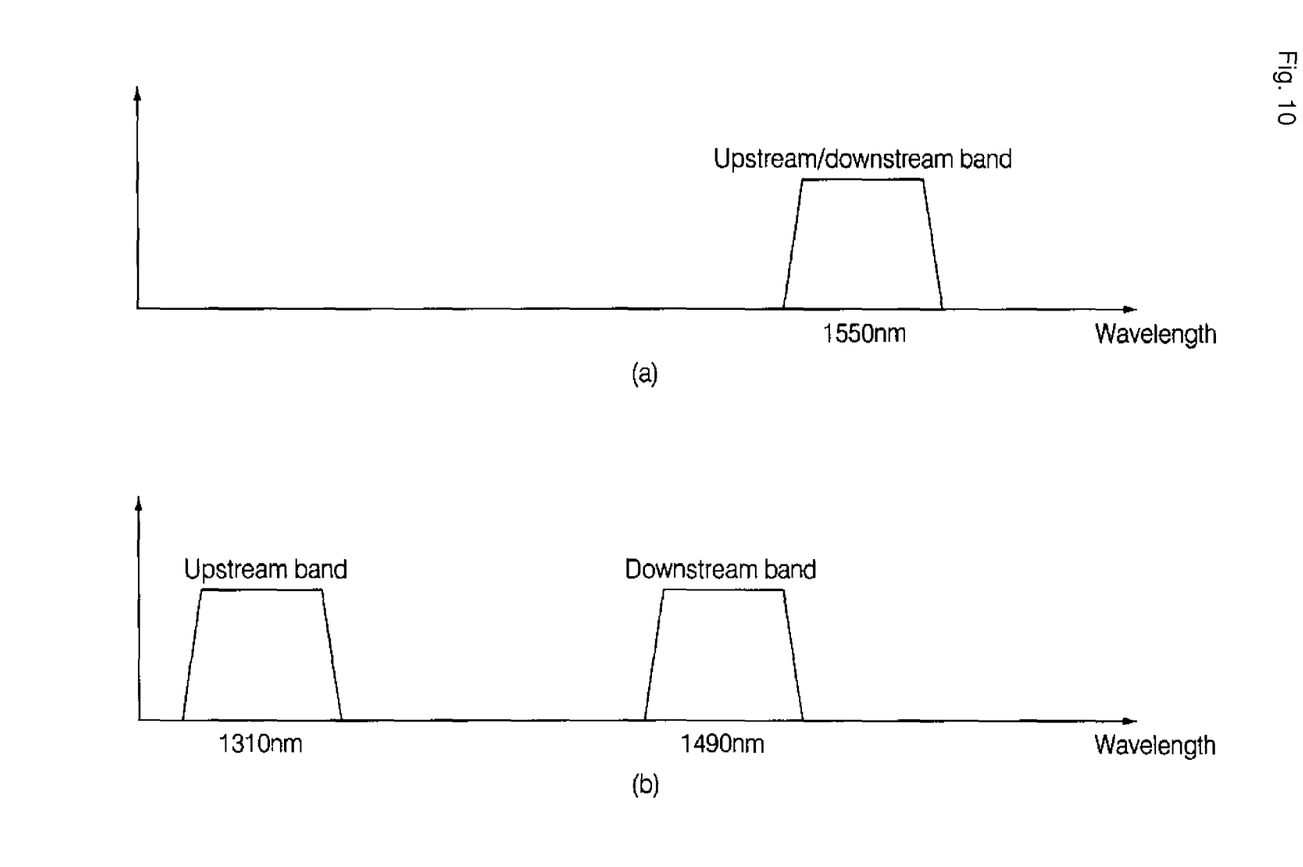
FIG. 10 is a view comparatively illustrating the spectrums before and after wavelength conversion in the optical wavelength conversion device of FIG. 9.

FIG. 10 is a view comparatively illustrating the spectrums before and after wavelength conversion in the optical wavelength conversion device of FIG. 9. In FIG. 10, the longitudinal axis represents optical power. Referring to the drawing, FIG. 10 compares the wavelength bands of upstream and downstream optical signals before and after wavelength conversion in the optical wavelength conversion device 500 of FIG. 9

Upstream and downstream signals having a wavelength near 1550 nm are wavelength-converted in the optical wavelength conversion device 500 of FIG. 9, and then converted into a downstream optical signal of 1490 nm wavelength and a upstream optical signal of 1310 nm wavelength. This is just an illustration of one example, and light of any wavelength can be converted into light of a desired wavelength by having a laser diode and a semiconductor reflective optical amplifier that have a structure suggested by the present invention and a target wavelength.

Figure 11:
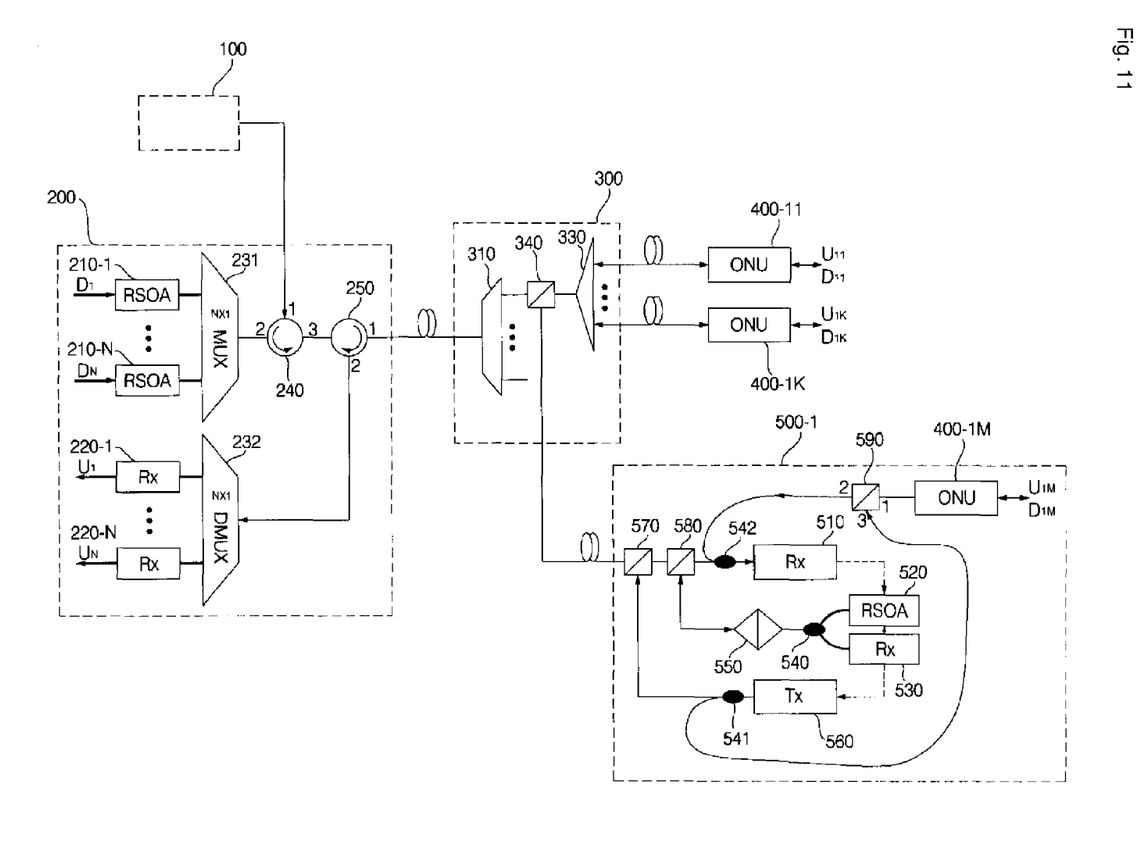
FIG. 11 is a block diagram illustrating a WDM-PON system according to one embodiment of the present invention.

FIG. 11 is a block diagram illustrating a WDM-PON system according to one embodiment of the present invention.

Referring to the drawing, the WDM-PON system of FIG. 11 has a structure in which the ONU 400 of a subscriber end is coupled to the optical wavelength conversion device 500 for use.

An upstream optical signal of 1310 nm wavelength transmitted from a designated ONU 400-1M is inputted into a first port of a third optical filter 590 and outputted to a second port thereof, and combined with other upstream optical signals of 1310 nm wavelength transmitted from the first port of the second optical filter 580 and inputted into the first optical receiver 510. Meanwhile, the optical power of a downstream optical signal of 1490 nm wavelength outputted from the first optical transmitter 560 is split in the optical coupler 541, some part is inputted into the second port of the first optical filter 570 and the other part is inputted into a third port of the third optical filter 590 and outputted to the first port thereof, and they are inputted into the designated ONU 400-1M and converted into an electric signal.

In the WDM-PON system according to the embodiments of the present invention an external seed light module uses a spectrum-sliced light, thus preventing most of the loss caused by spectrum slicing upon passing through the optical wavelength multiplexer WDM MUX located on a communications link.

Furthermore, the WDM-PON system according to the embodiments of the present invention can improve transmission distance and transmission quality since seed light of a high power can be injected into the optical transmitters of the OLT.

Additionally, the WDM-PON system according to the embodiments of the present invention can use a dense wavelength division multiplexing (DWDM) method at the feeder fiber section while accommodating the conventional TDMA-PON optical network unit and optical power splitter without replacement by including an optical wavelength conversion device at a subscriber side. Consequently, feeder fiber can be reduced, and ultimately WDM-PON can be applied from a cost and economical standpoint.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

INDUSTRIAL APPLICABILITY

The present invention is applied to a WDM-PON system or the like to reduce the loss caused by spectrum slicing upon passing through an optical wavelength multiplexer (WDM MUX) located on a communications link.

We claim:

1. A wavelength division multiplexing-passive optical network system, comprising:
    an optical line termination located at a central office, and for transmitting an optical signal to a subscriber side and receiving an optical signal from the subscriber side;
    a seed light module located at the central office, and for supplying a spectrum-sliced seed light including a plurality of wavelengths to corresponding optical transmitters of the optical line termination; and
    an optical network unit located at the subscriber side, and for receiving an optical signal from the optical line termination, converting the same into an electric signal to obtain downstream information and transmitting an optical signal containing upstream data to the optical line termination, the optical network unit including
        an optical receiver for receiving a first portion of the optical signal and restoring the downstream information, and
        an optical transmitter for receiving a second portion of the optical signal, changing the received portion into a pseudo continuous wave light by removing the downstream information, and modulating the pseudo continuous wave light into the upstream data.

2. The wavelength division multiplexing-passive optical network system of claim 1, further comprising:
    a remote node located at a remote location, and for wavelength-demultiplexing a wavelength-multiplexed signal from the optical line termination and outputting the same to the subscriber side, and wavelength-multiplexing signals from the subscriber side and outputting the same to the optical line termination.

3. The wavelength division multiplexing-passive optical network system of claim 2, wherein the feeder fiber section between the optical line termination and the remote node is made of a single optical fiber.

4. The wavelength division multiplexing-passive optical network system of claim 2, wherein the remote node comprises an optical wavelength multiplexer for wavelength-demultiplexing wavelength-multiplexed downstream optical signals transmitted from the optical line termination and wavelength-multiplexing optical signals of different optical wavelengths transmitted from the optical network unit.

5. The wavelength division multiplexing-passive optical network system of claim 2, wherein the remote node further comprises an optical circulator for separating upstream and downstream optical signals, and
    the feeder fiber section between the optical line termination and the remote node is made of two optical fibers for upstream and downstream.

6. The wavelength division multiplexing-passive optical network system of claim 2, wherein
    the optical line termination comprises an optical circulator for separating upstream and downstream optical signals,
    the feeder fiber section between the optical line termination and the remote node is made of a single optical fiber, and
    the remote node further comprises respective optical power splitters for respective wavelengths.

7. The wavelength division multiplexing-passive optical network system of claim 6, wherein the remote node further comprises respective optical power splitters for respective wavelengths.

8. The wavelength division multiplexing-passive optical network system of claim 7, wherein the optical line termination further comprises optical amplifiers for amplifying upstream and downstream optical signals in order to increase optical transmission distance.

9. The wavelength division multiplexing-passive optical network system of claim 1, wherein the optical line termination comprises:
    a plurality of optical transmitters for transmitting optical signals containing downstream information;
    a plurality of optical receivers for receiving upstream optical signals;
    an optical wavelength multiplexer for wavelength-multiplexing downstream optical signals of different wavelengths;
    an optical wavelength demultiplexer for wavelength-demultiplexing upstream optical signals of different wavelengths;
    a first optical circulator for circulating the light received from the seed light module in the direction of the optical wavelength multiplexer and circulating wavelength-multiplexed optical signals outputted from the optical wavelength multiplexer in the direction of a feeder fiber; and
    a second optical circulator for circulating the downstream optical signals sent from the first optical circulator to the feeder fiber and circulating the upstream optical signals transmitted from the feeder fiber in the direction of the optical wavelength demultiplexer.

10. The wavelength division multiplexing-passive optical network system of claim 1, wherein the seed light module comprises:
an erbium-doped optical fiber;
a pump light source for generating a carrier by injecting external light into the erbium-doped optical fiber;
an optical coupler for introducing light of the pump light into the erbium-doped optical fiber;
an optical wavelength demultiplexer for spectrum-slicing a broadband light outputted in a backward direction from the erbium-doped optical fiber;
an optical wavelength multiplexer for optical wavelength-multiplexing the light spectrum-sliced by the optical wavelength demultiplexer; and
an optical circulator for circulating the light outputted from the optical wavelength multiplexer in the direction of the erbium-doped optical fiber and circulating the light outputted in the backward direction from the erbium-doped optical fiber in the direction of the optical wavelength demultiplexer.

11. The wavelength division multiplexing-passive optical network system of claim 1, wherein the seed light module comprises:
an optical amplifier for amplifying external light;
an optical wavelength demultiplexer for spectrum-slicing a broadband light outputted in the backward direction from the optical amplifier;
an optical wavelength multiplexer for wavelength-multiplexing the light spectrum-sliced by the optical wavelength demultiplexer; and
an optical circulator for circulating the light outputted from the optical wavelength multiplexer in the direction of the optical amplifier and circulating the light outputted in the backward direction from the optical amplifier in the direction of the optical wavelength demultiplexer.

12. The wavelength division multiplexing-passive optical network system of claim 1, wherein the seed light module comprises:
an erbium-doped optical fiber;
a pump light source for generating carriers by injecting external light into the erbium-doped optical fiber;
an optical coupler for introducing light of the pump light into the erbium-doped optical fiber; and
an optical wavelength demultiplexer, whose tip end is coated with high reflectivity, for spectrum-slicing a broadband light outputted in the backward direction from the optical fiber and wavelength-multiplexing the light spectrum-sliced by the wavelength demultiplexer.

13. The wavelength division multiplexing-passive optical network system of claim 12, wherein the seed light module further comprises: an optical amplifier for improving the output power of the spectrum-sliced light.

14. A wavelength division multiplexing-passive optical network system, comprising:
an optical line termination located at a central office, and for transmitting a plurality of optical signals to a subscriber side and receiving a plurality of optical signals from the subscriber side;
a seed light module located at the central office, and for supplying a spectrum-sliced seed light including a plurality of wavelengths to corresponding optical transmitters of the optical line termination;
an optical network unit located at the subscriber side, and for receiving an optical signal from the optical line termination, converting the same into an electric signal to obtain downstream information and transmitting an optical signal containing upstream data to the optical line termination;
an optical wavelength conversion device for wavelength-converting upstream and downstream signals into signals of different wavelength bands; and
a remote node located at a remote location, for wavelength-demultiplexing wavelength-multiplexed signals from the optical line termination and outputting the demultiplexed signals to the subscriber side, and wavelength-multiplexing optical signals from the subscriber side and outputting the multiplexed signals to the optical line termination, the remote node including
an optical wavelength multiplexer for wavelength-demultiplexing the wavelength-multiplexed signals transmitted from the optical line termination and wavelength-multiplexing the optical signals from the subscriber side, and
an optical filter for delivering an optical signal between the optical wavelength multiplexer and the optical wavelength conversion device,
wherein the optical wavelength conversion device is located at the remote node or at the subscriber side.

15. The wavelength division multiplexing-passive optical network system of claim 14, wherein the optical wavelength conversion device comprises:
a first optical receiver for converting an optical signal from the optical network unit into an electric signal;
a second optical receiver for converting an optical signal from the optical wavelength multiplexer into an electric signal;
a first optical transmitter for converting the electric signal from the second optical receiver into an optical signal;
a second optical transmitter for converting the electric signal from the first optical receiver into an optical signal;
first and second optical filters for delivering an optical signal from the optical filter;
an optical coupler for splitting the optical power of the optical signal outputted from the second optical filter; and
a bidirectional amplifier for amplifying the optical signal from the optical coupler or the optical signal from the second optical filter.

16. The wavelength division multiplexing-passive optical network system of claim 15, wherein the optical wavelength conversion device further comprises:
an optical network unit; and
a third optical filter,
wherein an optical signal from the optical network unit is combined with other optical signals and inputted into the first optical receiver, and
an optical signal outputted from the first optical transmitter is inputted into the optical network unit and converted into an electric signal.

* * * * *